J. W. SEALE.
OIL OR GAS COOKING STOVE.
APPLICATION FILED FEB. 17, 1913.
1,096,200.
Patented May 12, 1914.
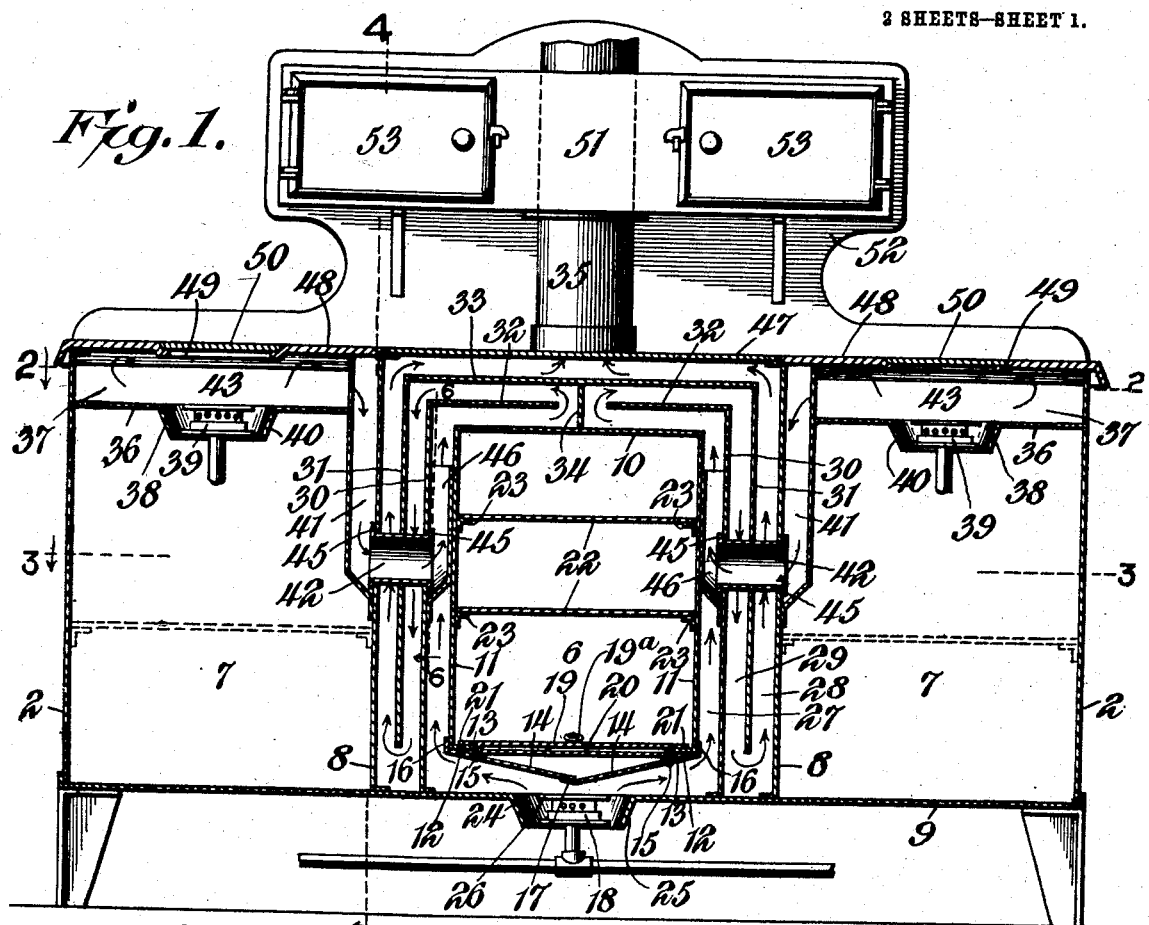
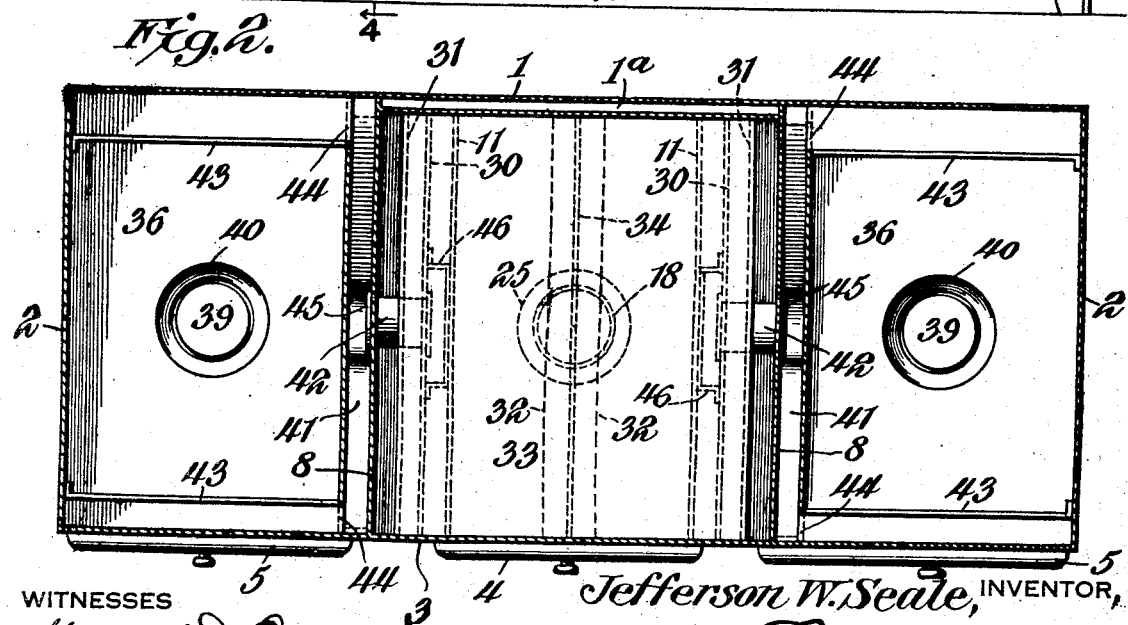
Jefferson W. Seale, INVENTOR

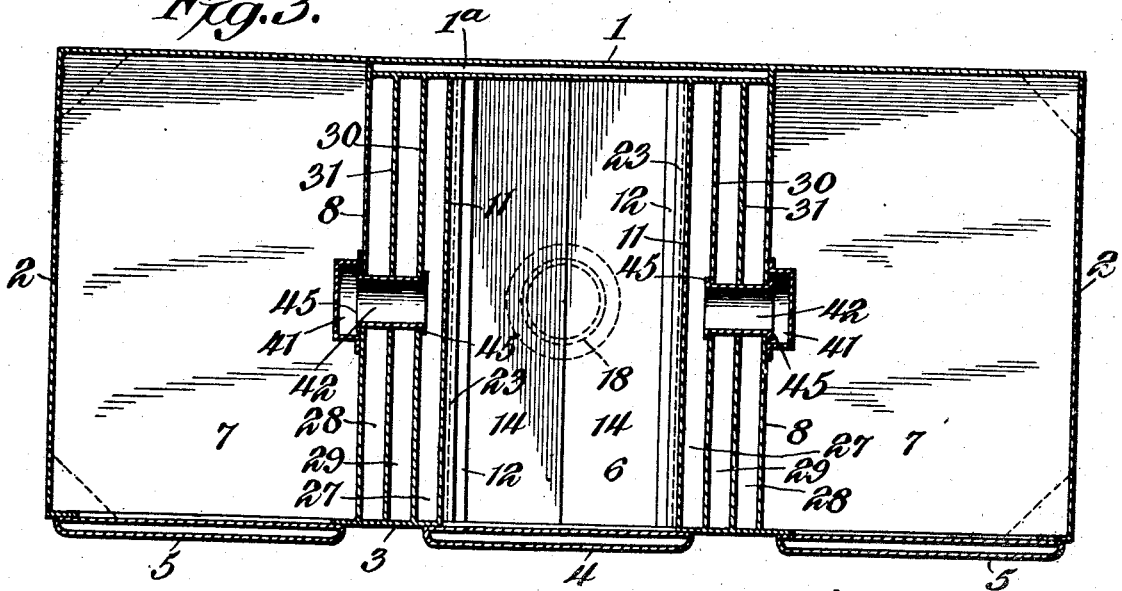
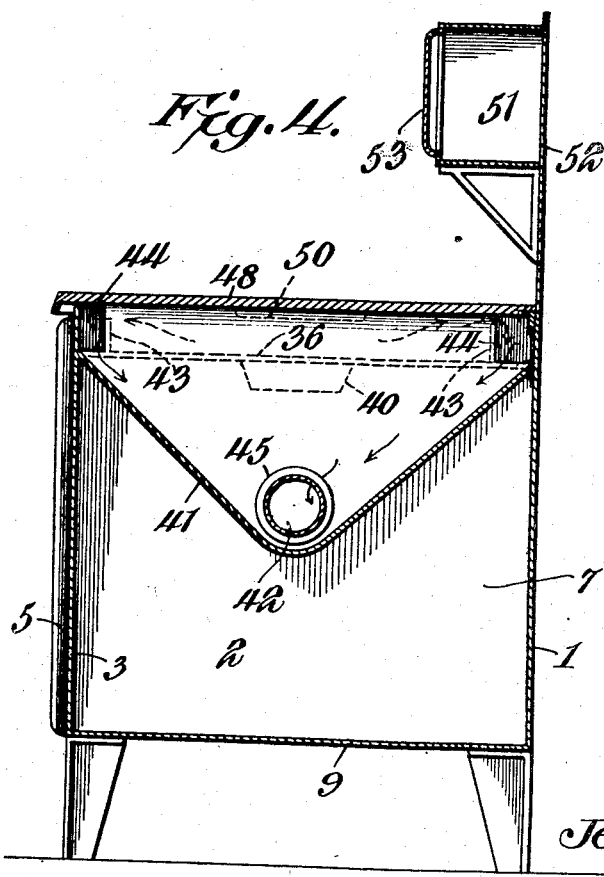
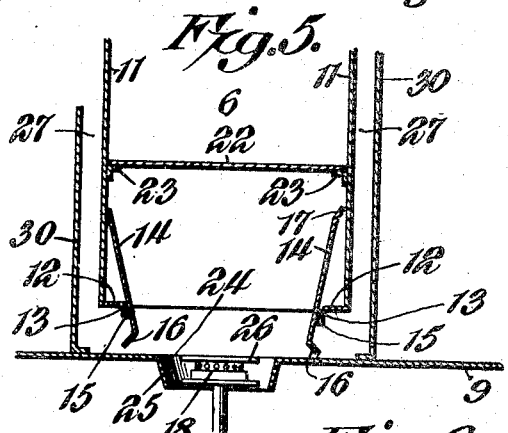
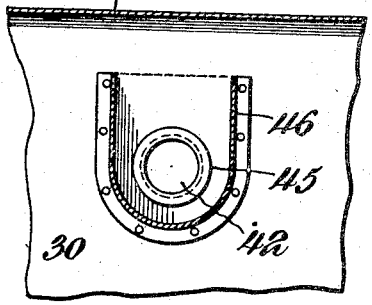

UNITED STATES PATENT OFFICE.

JEFFERSON W. SEALE, OF MINERAL WELLS, TEXAS.

OIL OR GAS COOKING-STOVE.

1,096,200.          Specification of Letters Patent.      Patented May 12, 1914.

Application filed February 17, 1913. Serial No. 748,904.

*To all whom it may concern:*

Be it known that I, JEFFERSON W. SEALE, a citizen of the United States, residing at Mineral Wells, in the county of Palo Pinto and State of Texas, have invented a new and useful Oil or Gas Cooking-Stove, of which the following is a specification.

The invention relates to improvements in oil and gas cooking stoves.

The object of the present invention is to improve the construction of oil and gas cooking stoves, and to provide a simple, inexpensive and efficient oil or gas stove adapted to effect a saving of fuel, and capable of producing perfect combustion and a maximum utilization of heat and products of combustion and of eliminating the odor of oil or gas.

A further object of the invention is to provide a cooking stove of this character in which the burners will be interiorly arranged and protected from drafts to eliminate the danger of accidents resulting from the blowing out of a lighted burner and enable the doors and windows of a kitchen or other compartment to be left open without affecting the operation of the burners.

The invention also has for its object to provide a cooking stove constructed to afford at its top an increased amount of heating surface and adapted to furnish different degrees of heat for quick, ordinary and slow heating for various cooking operations and other purposes.

Another object of the invention is to provide a cooking stove equipped with an oven adapted to retain the vapors or odors rising from the articles being cooked and thereby obviate the necessity of employing basters and roasters, paper sacks, and analogous devices for this purpose.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a vertical sectional view of a cooking stove, constructed in accordance with this invention. Fig. 2 is a horizontal sectional view on the line 2—2 of Fig. 1. Fig. 3 is a similar view on the line 3—3 of Fig. 1. Fig. 4 is a vertical sectional view on the line 4—4 of Fig. 1. Fig. 5 is a detail sectional view of a portion of the stove, illustrating the construction of the hinged sections of the bottom of the oven and their arrangement with relation to the bottom burner. Fig. 6 is a detail sectional view on the line 6—6 of Fig. 1.

Like numerals of reference designate corresponding parts in all the figures of the drawings.

In the accompanying drawings in which is illustrated the preferred embodiment of the invention, the stove comprises in its construction a substantially rectangular casing having rear and end walls 1 and 2, constructed of sheet metal, the rear wall 1 being provided with a dead air space $1^a$ at the back of the oven hereinafter described. The dead air space $1^a$ is formed by two plies or thicknesses of metal, the inner ply or thickness being set into the oven, as clearly illustrated in Figs. 2 and 3 of the drawings. The casing is also provided with a front wall 3, equipped with center and side doors 4 and 5 also constructed of two plies or thicknesses of sheet metal or other suitable material forming interior dead air spaces. The central door 4 communicates with the interior of an oven 6 and the side doors with end compartments 7, formed by vertical partitions 8, extending from the top of the casing to the bottom 9 thereof and from the rear wall 1 to the front wall 3 and arranged in spaced relation with the oven 6. The oven, which is arranged in spaced relation with the top and bottom of the casing and partitions 8 thereof, extends from the rear wall 1 to the front wall 3 and is designed to be constructed of sheet metal or other suitable material. It comprises a horizontal top wall 10 and vertical side walls 11 having their lower edges extended inwardly to form horizontal bottom flanges 12, which are angularly bent to provide inner depending inclined portions 13. The oven is provided with a bottom composed of sections 14, hinged at 15 at points adjacent to their outer side edges to the depending inclined portions 13 of the bottom flanges of the side walls of the oven, and the outer edges 16 of the hinged bottom sections are angularly bent and extend upwardly and overlap the side walls of the oven when the sections of the bottom are closed, as illustrated in Fig. 1 of the drawings. The sections 14 when closed extend inwardly and downwardly and one of the sections is provided at its inner edge with an angularly bent portion 17, which underlies the lower face of the other section to provide a lap joint when the hinged sections 14 are closed. The outer flanges 16 are disposed at an obtuse angle to the body portions of the bottom sections 14, and are arranged in a vertical position when the sections are closed and fit the lower corners of the oven. The hinged sections 14 are adapted to be opened to afford access to a bottom burner 18 for lighting the same from the interior of the stove or other purpose. In the drawings, a single burner is illustrated at the bottom of the stove, but any number of burners may, of course, be employed, and the burners of the stove may be either gas or gasolene, or the stove may be equipped with any other suitable heating device. The oven is also equipped with a removable false bottom 19 fitting snugly the lower portion of the oven and composed of upper and lower plies or thicknesses, the lower ply or thickness 20 being spaced from the upper ply or thickness and terminating short of the side edges thereof and forming side flanges or portions 21, which rest upon the horizontal portions of the side flanges 12 of the sides of the oven. The thickened portion of the false bottom due to the addition of the lower ply or thickness is located between the side flanges 12 of the oven, and the false bottom snugly fits the space in which it is arranged, as clearly illustrated in Fig. 1 of the drawings. In practice the false bottom will be equipped with a suitable eye 19ª adapted to be engaged by a hook to facilitate the ready removal of the false bottom. The spaced plies or thicknesses of the false bottom and the hinged sections, which are spaced from the said false bottom, provide interior or intervening air spaces and are adapted to prevent a too intense heating of the bottom of an oven, and the hinged sections, which are oppositely inclined when closed, are adapted to divide the heat and other products of combustion and cause the same to ascend uniformly at each side of the oven. As there are no perforations through the inner walls of the oven, the latter retains all the moisture and aroma arising from food, and as it prevents the latter from scorching and renders it moist and juicy, separate cooking utensils constructed particularly for obtaining this result are rendered unnecessary. The oven is also equipped with a plurality of shelves 22, supported at their side edges upon angle strips 23, which are suitably secured to the inner faces of the side walls of the oven.

The bottom burner 18 is arranged at an opening 24 in the bottom 9, which is provided at the said opening with a depending downwardly tapered annular flange 25, forming a shield for the burner and adapted to protect the same from drafts and limit or control the flow of air to the same. The burner is provided with a horizontal plate 26, constructed of imperforate sheet metal or other suitable material, and suitably secured to the burner at the top thereof and extending outwardly therefrom and adapted to diffuse the heat and cause a more thorough mixing of air and gas and thereby secure a more perfect combustion.

The space at the top and side walls of the oven is divided into inner, outer and intermediate passages 27, 28 and 29 by inner and outer interior partitions 30 and 31, extending from the front to the rear wall of the casing. Two inner partitions 30 are employed and each consists of a vertical portion extending upwardly from the bottom 9 of the casing to a point above the oven and terminating short of the top of the casing and provided with an upper inwardly extending horizontal portion 32, terminating short of the center of the space above the top of the oven. The outer intermediate partitions 31 consist of vertical side portions and a horizontal connecting portion 33. The horizontal top connecting portion is arranged in spaced relation with the horizontal top portions of the inner interior partitions 30 and the top of the casing, and the vertical side portions of the outer interior partition 31 extend downwardly from the top portion 33 and terminate short of the bottom 9 of the casing to cause the outer and intermediate passages 28 and 29 to communicate at the bottom of the casing. The space between the inner edges of the horizontal top portions 33 of the inner interior partitions is divided by a central longitudinal partition 34, extending from the front wall of the casing to the rear wall of the same and secured at its lower edge to the top wall of the oven and at its upper edge to the horizontal connecting portion 33 of the outer interior partition 31. By terminating the horizontal top portions 32 short of the central vertical longitudinal top partition 34, the inner and intermediate passages 27 and 29 are connected at the top of the oven. By this arrangement of the passages, the heat and other products of combustion are caused to travel from the bottom burner upwardly at opposite sides of the oven through the inner passages to the center of the top of the oven where they enter the intermediate passages 29. The products of combustion then pass downwardly through the intermediate passages to the bottom of the stove where they enter the outer passages and they ascend the latter passing over the horizontal connecting portion 33 of the partition 31 and escape through the smoke pipe 35 to the chimney. The central vertical partition 34 divides the heat and other products of combustion at the top of the oven and causes a uniform heating of the oven.

The casing is provided in the end compartments at the upper portions thereof with horizontal partitions 36, connected at their outer edges with the end walls and at their front and rear edges with the front and rear walls of the casing and having their inner edges arranged in spaced relation with the vertical partitions 8. The horizontal partitions, which form fire boxes 37, are provided with openings 38 in which are arranged burners 39 of the same construction as the bottom burner 18. The horizontal partitions 36 are provided at the openings 38 with depending annular flanges 40, tapered downwardly and forming shields for the burners. When the top burners are used, the doors 5 of the side compartments are opened to assist in supporting combustion.

The horizontal partitions are spaced from the vertical partitions 8 to provide spaces for downwardly extending flues 41 for conducting the heat and products of combustion from the fire boxes or compartment 37 to the passages partially surrounding the ovens. Each flue 41 tapers downwardly and extends to a point below a horizontal tubular flue 42, and it is provided at its sides and bottoms with flanges, which are secured to the adjacent vertical partition 8. The upper portion of the flue 41 extends to the top of the casing and is connected with the same and with the inner edge of the adjacent horizontal partition 36, and it is provided at opposite sides with integral horizontal strips or extensions 43, arranged in vertical planes and extending across the fire box 37 and connected with the horizontal partition 36 and terminating short of the top of the casing. The partitions 43 are located in advance and in rear of the burner and in spaced relation with the front and rear walls of the casing to provide passages, which communicate with the depending flue 41 and the heat and products of combustion from the side burner pass over the upper edges of the partitions 43 and enter the flue 41 through openings formed by recesses 44, located at the front and back of the upper portion of the depending flue 41.

The tubular flues 42, which are preferably cylindrical, are mounted in openings of the partitions 8 and the interior partitions 30 and 31, and they are preferably provided with terminal flanges 45, which fit against the adjacent partitions, as clearly illustrated in Figs. 1 and 3 of the drawings. The horizontal flues 42, which are arranged centrally at the sides of the oven, extend from the depending flues 41 through the outer and intermediate passages 28 and 29 and communicate with the inner passages 27 at the central portions thereof, and in order to prevent the flues 42 from being blocked or choked by the upward passage of the products of combustion from the lower burner inverted hoods or shields 46 are provided. The inverted hoods or shields, which are approximately U-shaped in cross section, are open at their upper ends and are provided with closed tapered lower ends, and they extend from points below the inner ends of the horizontal flues 42 to points above the same, as clearly illustrated in Fig. 1 of the drawings. The inverted hoods or shields form partial flues, which extend upwardly from the inner ends of the horizontal flues 42, and the products of combustion from the side burners pass upwardly through the short inner flues or shields 46 and enter the inner passages 27, the products of combustion from the lower burners passing upwardly at either side of the said shields or flues 46. By this construction, the suction or draft from the chimney and the products of combustion rising from the lower burner produce a draft through the flues or passages, which connect the inner passages 27 with the side fire boxes 37, and the heat and products of combustion are drawn from the side fire boxes and are utilized for raising the temperature of the oven and the central portion of the top of the stove to assist in baking and roasting. Thus a complete and thorough utilization of the heat and other products of combustion from the burners is effected, and this operation together with the perfect character of the combustion eliminates the odor of oil or gas.

The top of the casing consists of central and end sections 47 and 48; the central section is constructed of sheet metal and the end sections 48, which are thicker than the central section, preferably consist of castings, but they may be constructed in any other suitable manner. The end sections of the top of the casing are provided with central stove holes or openings 49, and are equipped with solid lids 50, but grated lids may be substituted for the same when it is desired to expose a vessel to the direct heat of the side burners for quick heating. When the solid lids cover the stove holes or openings, the side or end sections of the top of the casing furnish a less intense heat for ordinary heating, and when it is desired to use the stove for slow heating, the vessel or vessels are placed upon the central section 47, which is heated by the products of combustion passing through the outer passages 28 to the chimney.

The stove is preferably equipped with a warming box 51, designed for keeping food in a warm condition and mounted upon an extension 52 of the rear wall of the casing. The warming box is provided with suitable doors 53, which may be of any preferred construction, and as the specific construction of the warming box does not constitute a portion of the present invention, further description thereof is deemed unnecessary.

What is claimed is:—

1. A stove of the class described including an oven provided with a bottom arranged to deflect heat around the outside of the oven and composed of sections hinged at their outer portions and arranged to swing upwardly into the oven, and a removable false bottom located within the oven above the sections and coöperating therewith to form a complete closure for the oven.

2. A stove of the class described including a casing provided at the bottom with a heating device, an oven arranged in spaced relation with the bottom of the casing and provided with a bottom arranged to deflect heat around the outside of the oven and composed of hinged sections arranged to swing upwardly into the oven to afford access to the heating device, and a removable false bottom located above the hinged sections and forming an intervening air space and coöperating with the said sections to form a complete closure for the oven.

3. A stove of the class described including a casing provided at the bottom with a heating device, an oven located within the casing in spaced relation with the heating device and provided with a bottom arranged to deflect heat around the outside of the oven and composed of downwardly and inwardly inclined sections extending entirely across the oven and forming a lap joint at their inner edges and hinged at their outer edges, said sections being adapted to divide the heat and products of combustion and arranged to swing upwardly into the oven to afford access to the heating device.

4. A stove of the class described including a casing provided at the bottom with a heating device, an oven located in the casing in spaced relation with the heating device and provided with a bottom extending entirely across the oven and arranged to deflect heat around the outside of the same and composed of downwardly and inwardly inclined sections forming a lap joint at their inner edges and hinged at their outer edges, said sections being adapted to divide the heat and products of combustion and arranged to swing upwardly into the oven to afford access to the heating device, and a removable horizontally disposed false bottom located above the hinged sections and forming an intervening space between it and the said bottom.

5. A stove of the class described including an oven having spaced sides provided with inwardly extending bottom flanges, a bottom composed of sections hinged to the said flanges and extending entirely across the space between the same so as to deflect heat around the outside of the oven, said sections being arranged to swing upwardly into the oven, and a removable false bottom located above the hinged sections and supported by the said flanges and coöperating with the said sections to form a complete closure for the oven.

6. A stove of the class described including an oven having spaced sides provided at their lower edges with inwardly extending flanges, a bottom composed of sections overlapped at their inner edges and hinged adjacent to their outer edges to the said flanges, the outer portions of the said sections fitting against the exterior of the oven and supporting the sections in an inclined position.

7. A stove of the class described including an oven having spaced sides provided at their lower edges with inwardly extending horizontal flanges, the latter being provided with inner depending portions, a bottom composed of inclined sections hinged to the depending portions of the said flanges and arranged at an inclination when in their closed position and adapted to swing upwardly into the oven, and a removable false bottom supported upon the said flanges and provided between the same with a thickened portion consisting of two spaced plies or thicknesses.

8. A stove of the class described including a bottom heating device, an oven located above the same, fire boxes located at the upper portion of the stove at opposite sides of the oven in spaced relation thereto, a plurality of passages located at the sides and top of the oven at the space between the latter and the fire boxes, flues located at opposite sides of the oven and extending through some of the said passages and communicating with other of said passages and connected with the fire boxes.

9. A stove of the class described including a casing, an oven, fire boxes located at the upper portion of the casing in spaced relation with the oven, heating devices arranged beneath the oven and in the fire boxes, a smoke pipe located above the oven, a plurality of passages arranged at the sides and top of the oven for conveying products of combustion from the bottom of the oven to the smoke pipe, flues arranged at opposite sides of the oven and extending through some of the said passages and communicating with others and connected with the fire boxes.

10. A stove of the class described including an oven, upper fire boxes arranged in spaced relation with the upper portion of the oven, inner, outer and intermediate passages located at the sides and top of the oven, horizontal flues extending through the outer and intermediate passages and communicating with the inner passages, and flues extending from the fire boxes to the horizontal flues and connecting the latter with the said fire boxes.

11. A stove of the class described including an oven, upper fire boxes arranged in spaced relation with the upper portion of the oven, inner, outer and intermediate passages located at the sides and top of the oven, horizontal flues extending through the outer and intermediate passages and communicating with the inner passages, and downwardly tapered flues extending from the fire boxes to the horizontal flues and communicating at their lower ends with the said horizontal flues and provided at their upper portions with openings communicating with the fire boxes at spaced points.

12. A stove of the class described including an oven, upper fire boxes arranged in spaced relation with the upper portion of the oven, inner, outer and intermediate passages located at the sides and top of the oven, horizontal flues extending through the outer and intermediate passages and communicating with the inner passages, vertical flues extending downwardly from the inner ends of the fire boxes to the horizontal flues and communicating with the latter and provided at their upper portions with front and rear openings, and front and rear partitions extending across the fire boxes and spaced from the top thereof and forming front and rear passages, which communicate with the vertical flues through the said openings.

13. A stove of the class described including an oven, upper fire boxes arranged in spaced relation with the upper portion of the oven, inner, outer and intermediate passages located at the sides and top of the oven, horizontal flues extending through the outer and intermediate passages and communicating with the inner passages and connected with the fire boxes, and inverted hoods or flues located within the inner passages and arranged to prevent the horizontal flues from being blocked or choked by an up draft through the inner passages.

14. A stove of the class described including an oven, upper fire boxes arranged in spaced relation with the upper portion of the oven, inner, outer and intermediate passages located at the sides and top of the oven, horizontal flues extending through the outer and intermediate passages and communicating with the inner passages and connected with the fire boxes, and inverted hoods or flues located within the inner passages and receiving the inner ends of the horizontal flues, said hoods or flues being closed at their lower ends and open at their upper ends.

15. A stove of the class described including a casing having spaced vertical partitions forming side or end compartments and provided thereat with doors, an oven located within the casing between the said partitions, horizontal partitions arranged at the tops of the side or end compartments and forming fire boxes, and passages located between the oven and the said vertical partitions and communicating with the said fire boxes.

In testimony, that I claim the foregoing as my own, I have hereto affixed my signature in the presence of two witnesses.

JEFFERSON W. SEALE.

Witnesses:
W. C. MASSEY,
S. A. OWENS.